May 5, 1925.
E. H. GOLD
COUPLER
Filed Nov. 9, 1921
1,536,785
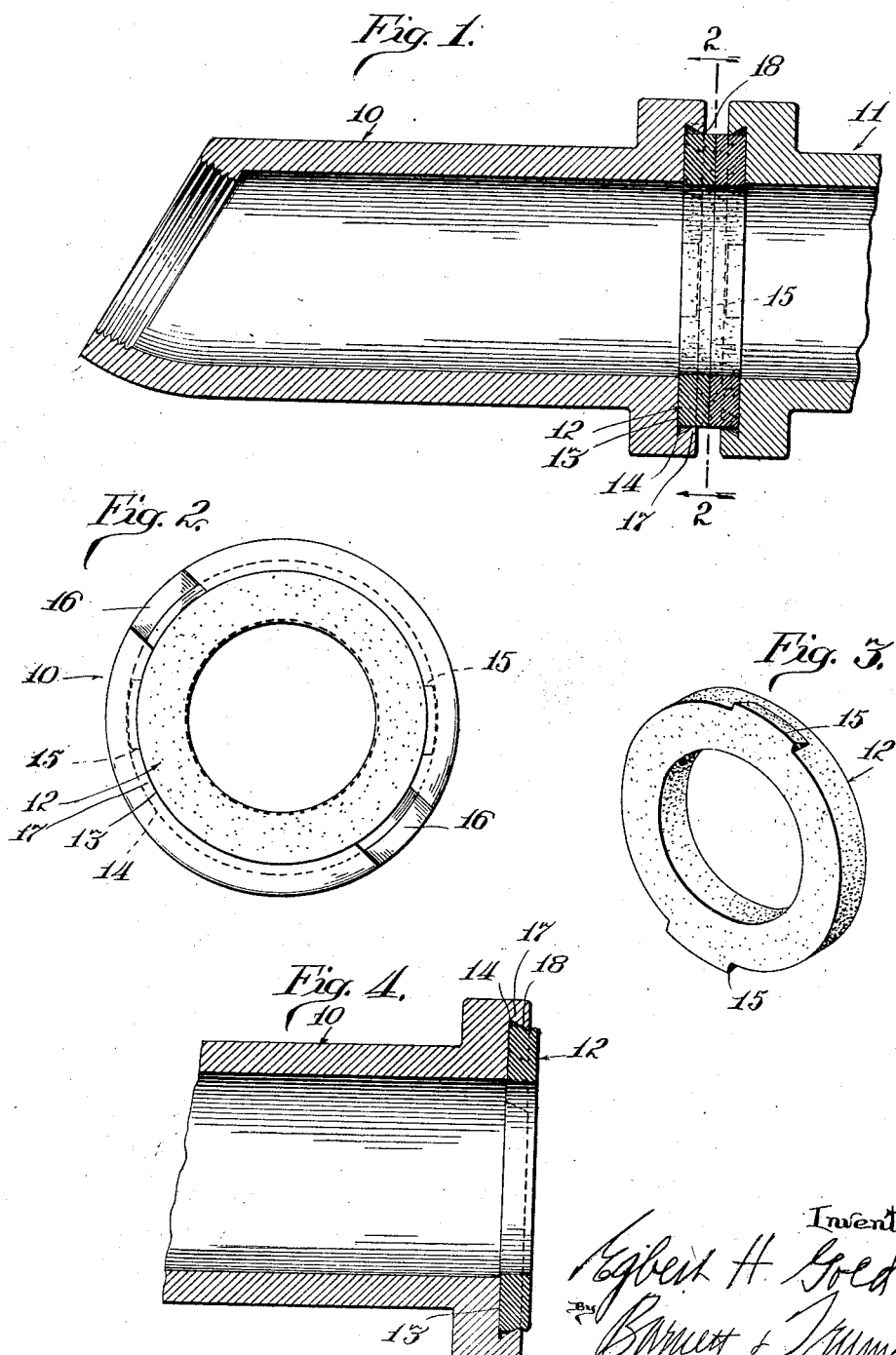

Patented May 5, 1925.

1,536,785

UNITED STATES PATENT OFFICE.

EGBERT H. GOLD, OF CHICAGO, ILLINOIS.

COUPLER.

Application filed November 9, 1921. Serial No. 513,927.

*To all whom it may concern:*

Be it known that I, EGBERT H. GOLD, a citizen of the United States, residing at Chicago, in the county of Cook and State of Illinois, have invented certain new and useful Improvements in Couplers, of which the following is a specification.

My invention relates to a hose coupler, and more particularly to a coupler to be used with a mating coupler for making the connection between the rubber hose, or equivalent elements, on the train pipes of the adjacent cars of a railroad train. The invention is concerned with the gasket employed on a coupler to seal the joint between the same and the mating coupler, and the object in view is to provide a gasket which can be very cheaply manufactured, together with a simple and effective expedient for securing the gasket in place at the opening of the port through the coupler, which does not involve employing any separate gasket holding device.

The invention is illustrated in a preferred embodiment in the accompanying drawing, in which—

Fig. 1 is a fragmentary sectional view of the conduit members of a pair of mating couplers furnished with gaskets according to my invention;

Fig. 2 is a cross sectional view on line 2—2 of Fig. 1;

Fig. 3 is a view in perspective of the gasket; and

Fig. 4 is a fragmentary longitudinal sectional view of the coupler and gasket, showing the relation of the gasket and coupler after the gasket has been in service for a short time.

I have illustrated the invention in connection with a hose coupler of the type disclosed in United States Patent No. 1,346,422, to Russell and Harriman, patented July 13, 1920, in which the coupler comprises a coupling member having interlocking engagement with the mating coupler, and a conduit member. To illustrate my present invention, it has been considered sufficient to show the conduit member only, as the invention is concerned with providing this member with means for sealing the joint between it and the mating coupler. The invention is not to be considered as limited to a coupler of this particular type. The invention may be utilized in connection with any of the hose couplers commonly employed for coupling together the train pipes of a railroad train.

Referring to the drawing: 10 designates the conduit member of a train pipe hose coupler, and 11 the corresponding member of the mating coupler. Each of the couplers, fragmentarily illustrated in Fig. 1 of the drawing, are shown as provided with gaskets in accordance with my invention. It will be understood, however, that a coupler provided with this type of gasket might be coupled up with any of the standard types of train pipe couplers, regardless of the sort of gasket that such other coupler might be furnished with.

12 is an annular gasket which is formed of any suitable material for making a fluid-tight joint between the couplers. I preferably employ a composition known as vulcabeston, which material is a composition of vulcanized rubber and asbestos. Such gaskets are hard and compressible to a slight extent and will expand slightly when subjected to the temperature of steam, so that (assuming the coupler is employed in connection with the steam train line), a steam-tight joint is assured between the couplers. The gasket 12 is arranged in a recessed seat 13 formed in the face of the coupler. The recess is preferably undercut, as indicated at 14, and the gasket is formed with two or more projections, preferably wedge-shaped in cross section, two being shown in the drawing and designated 15, 15, which projections are adapted to extend into the undercut portion 14 of the recessed seat. In order to insert the gasket in its seat, the face of the coupler is formed with a pair of diametrically arranged recesses 16, substantially as wide as projections 15, which intersect the undercut portion 14 of the recess 13. The gasket is placed against a coupler face with the projections 15 coinciding with recesses 16 and is then rotated so as to move the projections on the gasket under the overhanging lips 17 provided by the undercutting of the recess 13.

In service, a gasket so placed is subject to some pressure through the forcing or locking together of the couplers and to the effect of the relatively high temperatures of the steam which passes through the train pipe. As a result, the gasket, after a short period of use, will be expanded circumferentially. With the gasket seat undercut, as shown, the circumferential expansion of the gasket against the relatively sharp edges 18 of the overhanging lips 17 will produce a slight offset of the gasket underneath the edges 18, these edges penetrating the edge portions of the gasket to a certain extent, as shown in Fig. 4, so that the gasket will resist rotation in its seat sufficiently to prevent the accidental turning of the gasket to a position aligning its lugs 15 with the recesses 16 in the coupler face.

I claim:

1. In combination, a coupler having a port extending therethrough, and an annular gasket of non-resilient material adapted to be inserted in said port and to be expanded circumferentially when the coupler is put into service; the coupler face being provided with a recessed gasket seat formed with an edge which penetrates the gasket when the latter is expanded, as set forth.

2. In combination, a coupler having a port extending therethrough, and provided with a gasket seat having an overhanging outer annular flange, and an annular gasket of initially rectangular cross section, the cylindrical peripheral surface of the gasket being of such diameter that the gasket can be passed through the opening in the overhanging flange into the gasket seat, there being spaced lugs on the gasket adapted to engage beneath the overhanging flange, and correspondingly spaced recesses in this flange to permit the insertion of these lugs.

3. In combination, a coupler having a port extending therethrough, and an annular gasket adapted to be expanded circumferentially when the coupler is put into service, the gasket being formed with projections on its outer edge and the coupler with inturned lips under which said projections are adapted to extend, which are spaced apart to permit the assembly of the gasket with the coupler and are formed with edges adapted to penetrate the edge portion of the gasket when the latter is expanded, as set forth.

4. In combination, a coupler having a port extending therethrough, and an annular gasket, the gasket being formed with wedge-shaped lugs on its outer edge which lugs extend beyond the peripheral surface of the gasket and the coupler with a gasket seat and with an inwardly turned lip forming an undercut recess to receive said lugs, and with recesses which intersect the undercut recess to allow the gasket to be assembled with the coupler.

5. In combination, a coupler having a port extending therethrough, and formed with a gasket seat and with a flange which projects over said seat and forms an undercut recess, and with diametrically arranged intersecting recesses, and an expansible annular gasket formed with a pair of diametrically arranged lugs substantially as wide as said intersecting recesses, which are adapted to pass through said recesses and, by rotation of the gasket, to extend into the undercut portion of the gasket seat.

EGBERT H. GOLD.